United States Patent
Wakita et al.

(10) Patent No.: US 6,954,334 B2
(45) Date of Patent: Oct. 11, 2005

(54) MAGNETIC HEAD AND ROTARY HEAD DRUM DEVICE

(75) Inventors: Toshiaki Wakita, Kanagawa (JP); Hisato Hirasaka, Tokyo (JP); Fumiharu Sudo, Tokyo (JP)

(73) Assignee: Sony Corporation (JP)

( * ) Notice: Subject to any disclaimer, the term of this patent is extended or adjusted under 35 U.S.C. 154(b) by 237 days.

(21) Appl. No.: 10/376,586

(22) Filed: Mar. 3, 2003

(65) Prior Publication Data

US 2003/0223151 A1 Dec. 4, 2003

(30) Foreign Application Priority Data

Mar. 6, 2002 (JP) .................................... P2002-059793

(51) Int. Cl.[7] .............................................. G11B 5/10
(52) U.S. Cl. .................................................. 360/128
(58) Field of Search .............................. 360/128, 129, 360/130.22, 130.23, 130.24, 251.5, 137, 110, 240

(56) References Cited

U.S. PATENT DOCUMENTS 4,636,902 A * 1/1987 Dalziel et al. ............... 360/128
4,816,950 A * 3/1989 Heinz et al. ................. 360/128

* cited by examiner

Primary Examiner—Julie Anne Watko
(74) Attorney, Agent, or Firm—Rader, Fishman & Grauer PLLC; Ronald P. Kananen

(57) ABSTRACT

A magnetic head mounted on a rotary head drum device comprises a head chip, and a magnetic shield disposed to surround all or a part of the surfaces other than a front surface of the head chip. The magnetic shield comprises a magnetic flux absorber made of ferrite and an electromagnetic wave shield made of copper. This enables a reduction of the amount of unnecessary magnetic fluxes and electromagnetic waves jumping away from the recording head to the reproducing head. Simultaneously, the magnetic flux absorber absorbs the magnetic flux coming from outside to the reproducing head before the magnetic flux reaches the head chip and the electromagnetic wave shield shields a high frequency electromagnetic wave which was not absorbed by the magnetic flux absorber 80 that it is possible to reduce the amount of the magnetic flux or the like jumping into the reproducing head and to improve the S/N of the reproduced signal.

8 Claims, 5 Drawing Sheets

MAGNETIC HEAD AND ROTARY HEAD DRUM DEVICE

CROSS REFERENCES TO RELATED APPLICATIONS

The present document is based on Japanese Priority Document JP 2002-059793, filed in the Japanese Patent Office on Mar. 6, 2002, the entire contents of which being incorporated herein by reference.

BACKGROUND OF THE INVENTION

1. Field of the Invention

The present invention relates to a magnetic head in which a magnetic shield is arranged to surround all or a part of the surfaces of a head chip thereof other than a front surface thereof, and to a rotary head drum having the magnetic shield. By having a magnetic shield constituted with a magnetic flux absorbing member and an electromagnetic shielding member in a layer structure, an unnecessary magnetic flux from a magnetic head for recording can be prevented from coming into a magnetic head for reproducing.

2. Description of the Related Art

A magnetic recording/reproducing apparatus utilizing a magnetic tape has a characteristic feature that it can store therein a large amount of information. Such a magnetic recording/reproducing apparatus is required to record and reproduce signals of a high transfer rate so as to exchange the large amount of information stored therein with an external device at a high speed.

Therefore, in order to record and reproduce a signal of a high transfer rate, there is suggested, as a rotary head drum device constituting a magnetic recording/reproducing apparatus, a number of magnetic heads for recording (recording magnetic heads) and magnetic heads for reproducing (reproducing magnetic heads) provided on a rotary drum.

In this kind of rotary head drum, a plurality of recording magnetic heads records signals on a magnetic tape and a plurality of reproducing magnetic heads reproduces the signals recorded on the magnetic tape.

By the way, when the number of recording magnetic heads and reproducing magnetic heads provided on the rotary drum increases, the recording magnetic head and the reproducing magnetic head are inevitably arranged to be close to each other. If the recording magnetic head and the reproducing magnetic head come close to each other, at a time of simultaneous recording/reproducing, an unnecessary magnetic flux or electromagnetic wave from a head chip of the recording magnetic head comes into a head chip of the reproducing magnetic head, which introduces deterioration in the signal-noise ratio(S/N)of a reproduced signal.

Accordingly, in order to reduce the amount of the unnecessary magnetic flux coming from the recording magnetic head into the reproducing magnetic head, there is employed a magnetic shield.

Conventionally, as a magnetic shielding method, there have been suggested a method of shielding an unnecessary electromagnetic wave from outside before it reaches a head chip using an electromagnetic wave shielding plate including a metal, a method of absorbing an unnecessary flux from outside before it reaches the head chip using a magnetic flux absorbing material including ferrite and the like.

SUMMARY OF THE INVENTION

By the way, the method employing the electromagnetic wave shielding plate as the magnetic shield is to shield the unnecessary electromagnetic wave from outside by means of the electromagnetic wave shielding plate and to protect the head chip of the reproducing magnetic head from the unnecessary electromagnetic wave. Thus, if there is a portion of the electromagnetic wave shielding plate having less shielding effect, the unnecessary electromagnetic wave comes into the reproducing magnetic head through the portion with less shielding availability and the shielding effect is reduced. This makes it extremely difficult to design and manufacture the electromagnetic wave shielding plate to have a certain thickness enough for shielding electromagnetic wave. As a result, this method only reduces about 10 dB of the incoming magnetic flux and requires further improvement.

In addition, the method employing the magnetic flux absorbing member, such as ferrite, as the magnetic shield has a problem that it cannot absorb an electromagnetic wave of a high frequency or the like.

In view of the above problems, the present invention is to provide a magnetic head and a rotary head drum device which comprise a magnetic shield having both a feature of a magnetic shield employing an electromagnetic wave shielding plate, such as a metal plate, and a feature of a magnetic absorber employing a magnetic flux absorbing member, such as ferrite.

A magnetic head according to the present invention comprises a head chip and a magnetic shield arranged to surround all or a part of the surfaces of the head chip other than a front surface thereof. Since the magnetic shield comprises a magnetic flux absorber and an electromagnetic wave shield, the magnetic flux absorber, such as ferrite, absorbs an unnecessary magnetic flux from outside before the magnetic flux reaches the head chip. Further, the magnetic shield, such as a metal plate, shields an electromagnetic wave having a high frequency which was not absorbed by the magnetic flux absorber. Thus, the head chip can be protected from the unnecessary magnetic flux, the high frequency electromagnetic wave and the like.

In addition, a rotary head drum device according to the present invention comprises a plurality of recording magnetic heads and a plurality of reproducing magnetic heads alternately provided on a rotary drum thereof in a circumferential direction thereof. All or a part of the surfaces other than a front surface of a head chip of both or either one of the recording magnetic heads and the reproducing magnetic heads are surrounded by a magnetic shield comprising a magnetic flux absorber and an electromagnetic wave shield. This enables the magnetic flux absorber, such as ferrite, to absorb an unnecessary magnetic flux from the recording magnetic head before the unnecessary magnetic flux reaches the head chip of the reproducing magnetic head. This also enables the electromagnetic wave shield, such as a metal plate to shield the high frequency electromagnetic wave which was not absorbed by the magnetic flux absorber. Thus, if the recording magnetic head and the reproducing magnetic head are arranged to be close to each other, the magnetic flux and the electromagnetic wave from the recording magnetic head coming into the reproducing magnetic head can be largely reduced. This leads to an improvement of the S/N of the reproduced signal at the time of simultaneous recording/reproducing.

In addition, in the rotary head drum device according to the present invention, the magnetic head has an engaging projection or an engaging recess. On the other hand, the rotary drum has an engaging recess or an engaging projection which engages with the engaging projection or the engaging recess of the magnetic head, respectively, at the time of fitting the magnetic head to the rotary drum. Accordingly, even when a centrifugal force is applied to the magnetic head due to the rotation of the rotary drum, it is possible to prevent the magnetic head from jumping away from the rotary drum.

BRIEF DESCRIPTION OF THE DRAWINGS

The above and other objects, features and advantages of the present invention will become more apparent from the following description of the presently-preferred exemplary embodiments of the invention taken in conjunction with the accompanying drawings, in which.

DESCRIPTION OF THE PREFERRED EMBODIMENTS

With reference to the attached drawings, the embodiments of the present invention will now be described.

Figure 1:
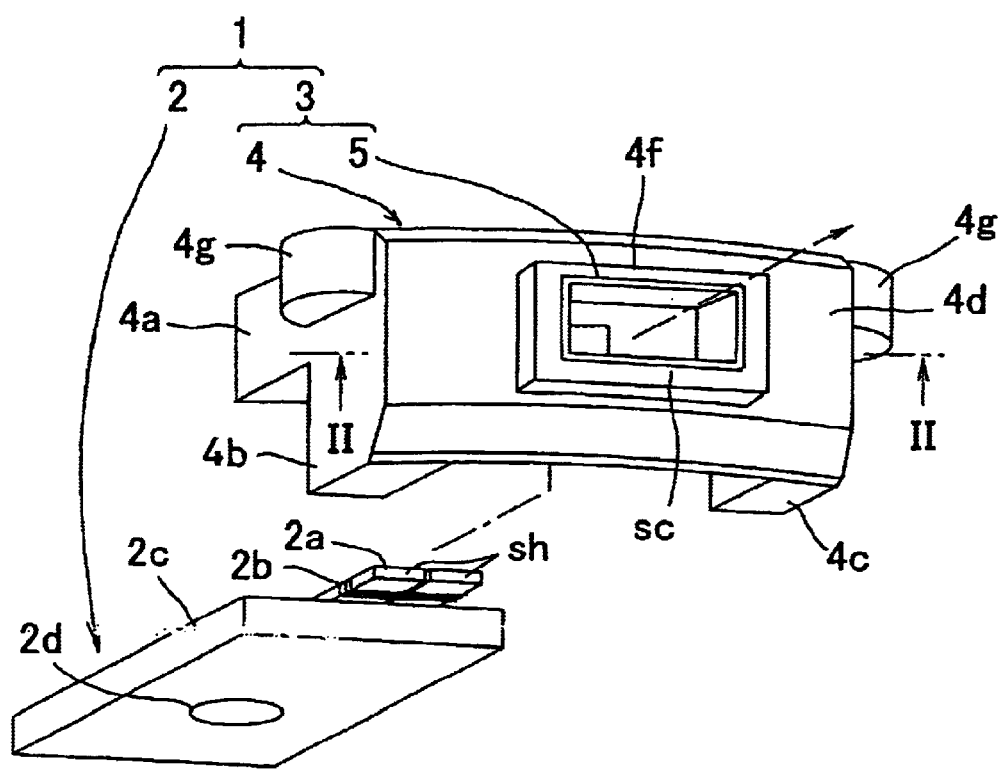
FIG. 1 is an exploded perspective view of a magnetic head.

FIG. 1 shows a magnetic head 1 as an embodiment of the present invention. The magnetic head 1 comprises a head chip 2 and a magnetic shield 3 disposed to surround all or a part of the surfaces of the head chip 2 other than a front surface thereof.

The head chip 2 constituted by winding a coil 2b around a core 2a is mounted on an upper face of a head base 2c. The head base 2c has a screw hole 2d to be used for fixing itself to a later-explained rotary drum.

The magnetic shield 3 comprises a magnetic flux absorber 4 and an electromagnetic wave shield 5.

The magnetic flux absorber 4 has a base 4a, side walls 4b and 4c on the right and left, and a front wall 4d.

Figure 2:
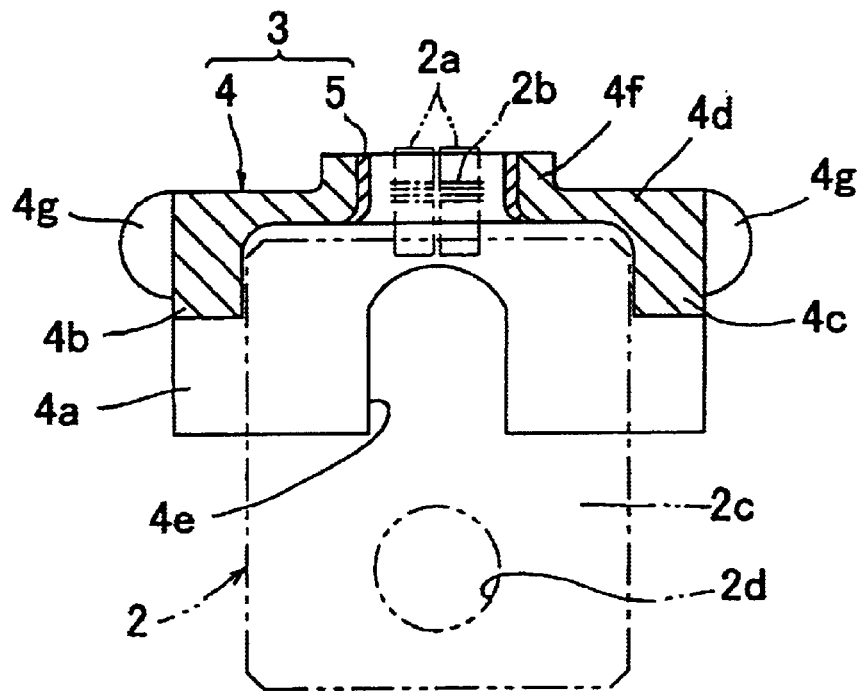
FIG. 2 is a cross-sectional view of FIG. 1 cut along a line II—II.
Figure 3:
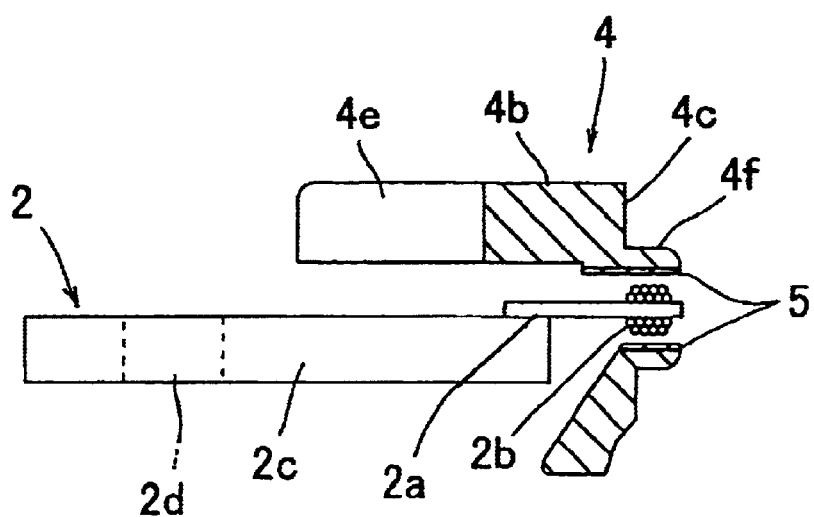
FIG. 3 is a cross-sectional view of a magnetic head.

As shown in FIG. 2, at the center of the base 4a, a screw hole 4e to which a later-explained head chip height adjuster screw is inserted is provided. At the center of the front wall 4d, a substantially-rectangular pipe 4f into which a tip of the head chip 2 is inserted. In addition, each outer side of the side walls 4b and 4c has an engaging projection 4g for preventing the magnetic head from jumping away from the rotary drum at the time the magnetic head is fixed to the rotary drum. The entire magnetic flux absorber 4 comprises ferrite having a high permeability.

An area "sc" of an end on the front surface of the substantially-rectangular pipe 4f is formed to be larger than an area "sh" of the front surface of the head chip 2. In addition, the magnetic flux absorber 4 is formed thicker than the head chip 2. According to this arrangement, a magnetic impedance of the magnetic flux absorber 4 is set lower than that of the head chip 2, and the magnetic flux absorbency thereof is set higher than that of the head chip 2.

The electromagnetic wave shield S is disposed on an inner peripheral surface of the substantially-rectangular pipe 4f of the magnetic flux absorber 4 such that it surrounds an outer periphery of the coil 2b of the head chip 2. The electromagnetic wave shield 5 is formed to be a ring shape with a metal plate of copper having an excellent shield effect with regard to electromagnetic waves or the like. The electromagnetic wave shield 5 is installed at least on the inner peripheral surface of the substantially-rectangular pipe 4f of the magnetic flux absorber 4 by means of adhesion or the like.

As shown in FIG. 2, the magnetic shield 3 is attached to the head chip 2 such that the side walls 4b and 4c clip the head base 2c of the head chip 2. In this way, the magnetic head 1 is formed.

Figure 4:
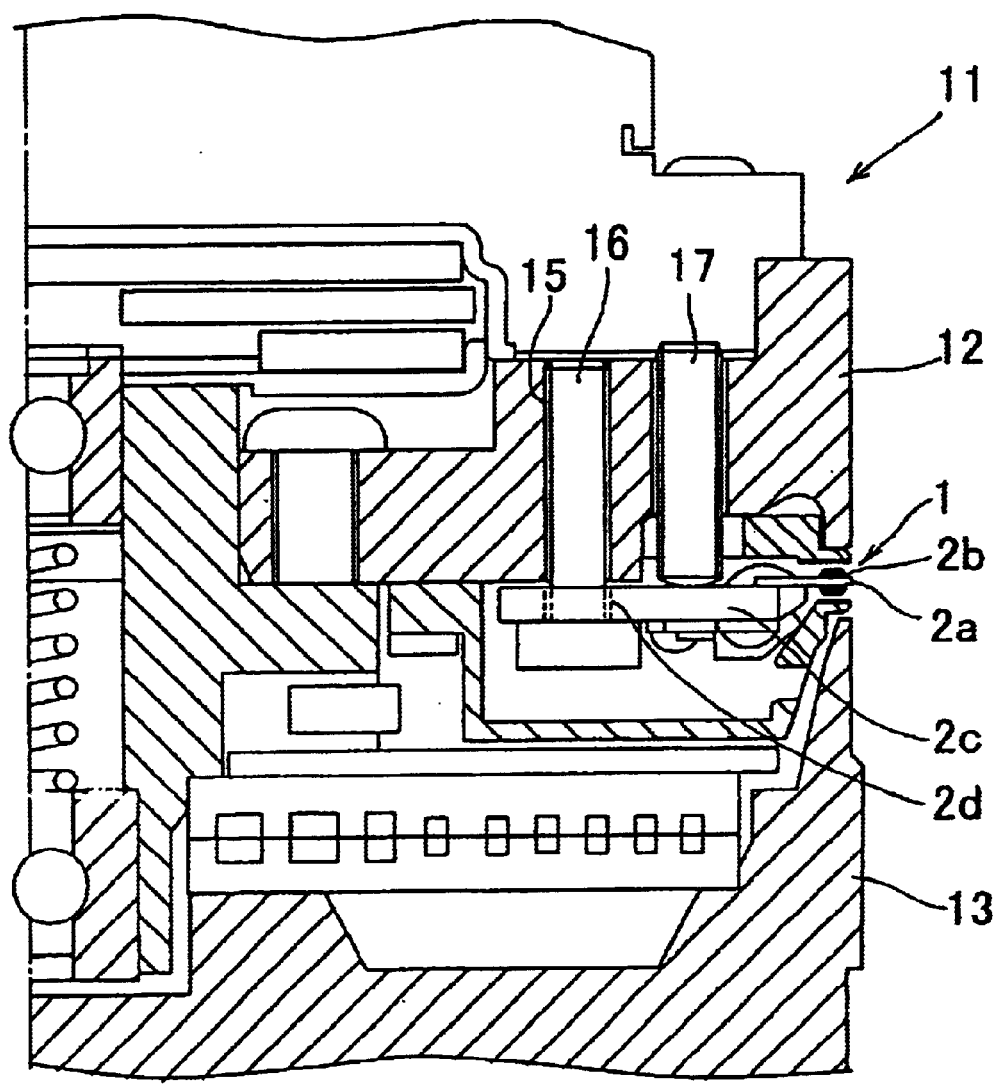
FIG. 4 is a cross-sectional view of a rotary head drum device.

FIG. 4 shows a rotary head drum device 11 which employs the above-described magnetic head 1. The rotary head drum device 11 comprises an upper drum 12 and a lower drum 13, and the upper drum 12 rotates.

The magnetic head 1 is attached to the upper drum 12 at a bottom surface thereof. A tip of the head chip 2 faces an outer peripheral surface of the rotary head drum device 11 through a space between the upper drum 12 and the lower drum 13.

Figure 5:
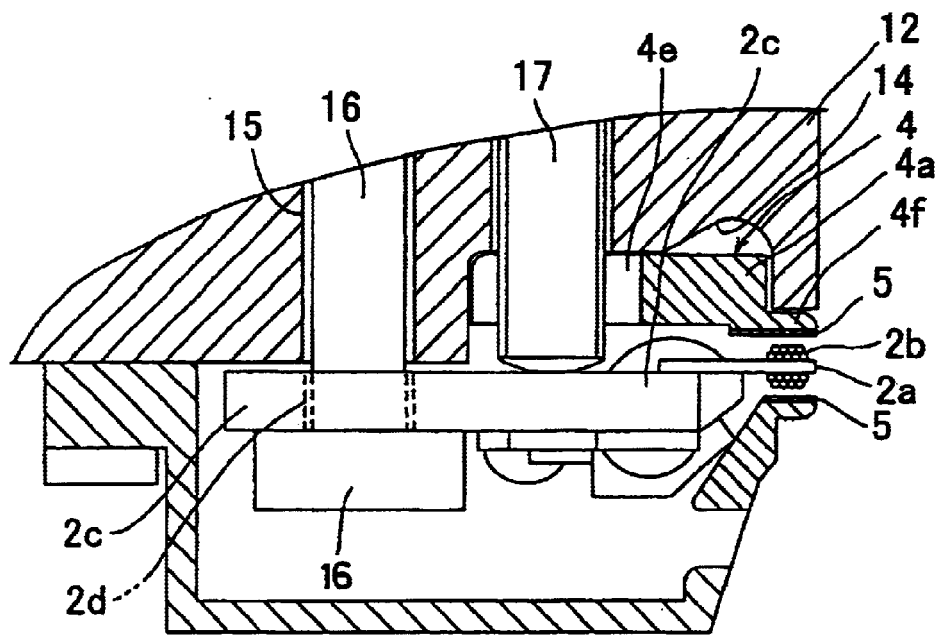
FIG. 5 is a main portion of FIG. 4.

Next, installation of the magnetic head 1 to the rotary head drum device 11 will be described. As shown in FIG. 5 in an enlarged view, the magnetic flux absorber 4 is engaged into a magnetic shield engaging portion 14 provided on the bottom of the upper drum 12 from a side of the base 4a. At this time, the engaging projection 4g provided on the outer surface of the side walls 4b and 4c of the magnetic flux absorber 4 engages with an engaging recess (not-shown) provided at the magnetic shield engaging portion 14 so as to prevent the magnetic head 1 jumping away from the rotary drum.

The head base 2c of the head chip 2 is screwed on the bottom of the upper drum 12 with a screw 16 screwed into a screw hole 15 of the upper drum 12 via the screw hole 2d. In addition, a head chip height adjuster screw 17 is screwed into the upper drum 12. A lower end of the head chip height adjuster screw 17 is in contact with the upper surface of the head base 2c of the head chip 2 via the screw hole 4e provided on the base 4a of the magnetic flux absorber 4.

Figure 6:
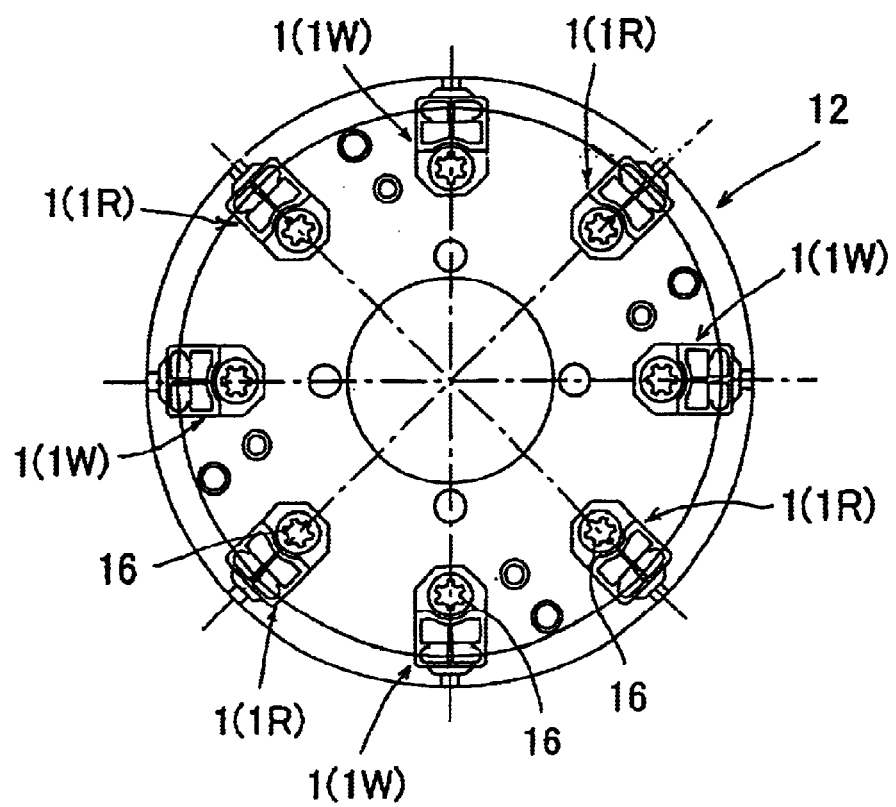
FIG. 6 is a view showing a bottom of an upper drum.

As shown in FIG. 6, there is disposed a plurality of (in FIG. 6, eight) magnetic heads 1 having an equal angle (in FIG. 6, 45°) therebetween on the bottom surface of the upper drum 12. Alternate ones of the plurality of magnetic heads 1 are used as a recording magnetic head 1W, and the other ones are used as a reproducing magnetic head 1R. Although not shown, the rotary drum 11 has a magnetic tape wound therearound in a predetermined angular range.

In the rotary head drum device 11, the plurality of recording magnetic heads 1W records a signal on the magnetic tape and the plurality of reproducing magnetic heads 1R reproduces the signal recorded on the magnetic tape.

In this case, since the magnetic impedance of the magnetic flux absorber 4 of the magnetic shield 3 of the recording magnetic head 1W is lower than the impedance in air, a part of the unnecessary magnetic flux from the head chip 2 of the recording magnetic head 1W is absorbed in the magnetic flux absorber 4 of the magnetic shield 3 of the reproducing magnetic head 1W and goes back to the head chip 2 of the recording magnetic head 1W through the magnetic flux absorber 4. In addition, the electromagnetic wave shield 5 of the magnetic shield 3 reduces leakage of the electromagnetic wave generated from the recording magnetic head 1W to outside. Therefore, among the unnecessary magnetic flux and electromagnetic waves from the head chip 2 of the recording magnetic head 1W, the magnetic flux and electromagnetic waves which go toward the reproducing magnetic head 1R decrease.

In addition, since the magnetic impedance of the magnetic flux absorber 4 of the magnetic shield 3 of the reproducing magnetic head 1R is lower than the impedance in air, the magnetic shield 3 of the reproducing magnetic head 1R absorbs part of the unnecessary magnetic flux which is not absorbed by the magnetic shield 3 of the recording magnetic head 1W when the unnecessary magnetic flux comes close to the reproducing magnetic head 1R. In addition, the electromagnetic wave shield 5 of the magnetic shield 3 of the reproducing magnetic head 1R shields the electromagnetic wave generated from the recording magnetic head 1W and prevents the electromagnetic wave from jumping into the head chip 2 of the reproducing magnetic head 1R.

In this way, by using the magnetic head 1 as both the recording magnetic head 1W and the reproducing magnetic head 1R, it is possible to largely reduce the amount of the magnetic flux and the electromagnetic wave jumping from the recording magnetic head 1W into the reproducing magnetic head 1R and improve the S/N of the reproduced signal at the time of simultaneous recording/reproducing.

Figure 7A:
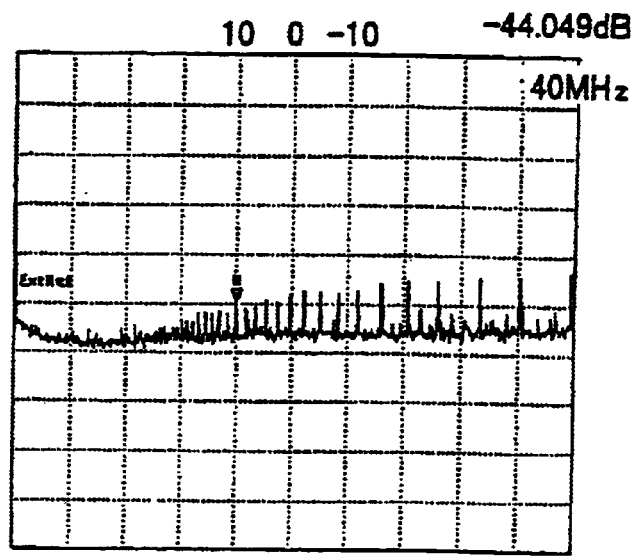
FIG. 7A shows a depressing effect onto an incoming magnetic flux according to the present invention and FIG. 7B shows a depressing effect onto an incoming magnetic flux according to a conventional example.
Figure 7B:
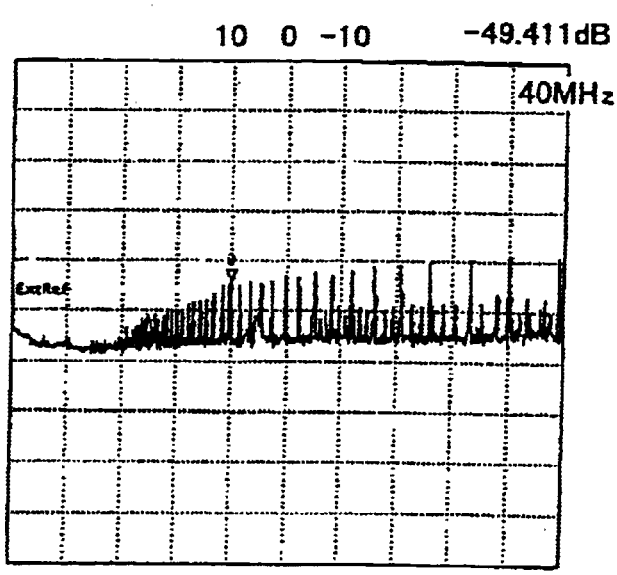

FIG. 7A shows a measured result of the amount of magnetic flux jumping into a reproducing magnetic head in a case of using the magnetic head 1 having the above-described magnetic shield 3, while FIG. 7B shows the measured result of a case of a magnetic head without the magnetic shield 3. The measurement was carried out in a condition that the distance between the recording magnetic head 1W and the reproducing magnetic head 1R was 10.9 mm.

According to the measured result, in the case of the magnetic head 1 with the magnetic shield 3, it was confirmed that the amount is reduced by approximately 5.4 dB at 40 MHz compared to the case without the magnetic shield 3. It is noted that the above-described embodiment shows the case where both the recording magnetic head 1W and the reproducing magnetic head 1R employ the magnetic shield 3 having the magnetic flux absorber 4 and the electromagnetic wave shield 5. However, the magnetic shield 3 may be employed only in one of the magnetic heads 1W and 1R. It is also noted that the above embodiment shows the case where ferrite is employed for the magnetic flux absorber 4 of the magnetic shield 3. However, the material of the magnetic flux absorber 4 is not limited to ferrite and any other material of high permeability may be employed in place thereof. Furthermore, the electromagnetic wave shield 5 is not limited to copper, and stainless steel or any other materials (conductors) may be employed instead of copper. It is noted that the above embodiment showed the case where the electromagnetic wave shield 5 is provided on the inner peripheral surface of the substantially-rectangular pipe 4f of the magnetic flux absorber 4. However, the area may be enlarged or the electromagnetic wave shield 5 may be provided not only on the inner peripheral surface but also on an outer peripheral surface side of the magnetic flux absorber 4. In addition, the electromagnetic wave shield 5 may be grounded.

In addition, the above embodiment showed the case where the engaging projection 4g is provided on the side of the magnetic shield 3 and the engaging recess is provided on the side of the rotary head drum device 11. However, it is of course possible to provide the engaging recess on the side of the magnetic shield 3 and the engaging projection on the side of the rotary head drum device 11 on the contrary.

Although the invention has been described in its preferred form with a certain degree of particularity, obviously many changes and variations are possible therein. It is therefore to be understood that the present invention may be practiced otherwise than as specifically described herein without departing from the scope and the sprit thereof.

What is claimed is:

1. A magnetic head comprising a head chip and a magnetic shield disposed so as to surround all or a part of surfaces of said head chip other than a front surface thereof, wherein:
    said magnetic shield comprises a magnetic flux absorber and an electromagnetic wave shield;
    said magnetic flux absorber has a pipe which surrounds an outer periphery of a coil of said head chip; and
    said electromagnetic wave shield is disposed on an inner peripheral surface of said pipe of said magnetic flux absorber.

2. The magnetic head according to claim 1, wherein:
    said magnetic flux absorber comprises ferrite, and
    said electromagnetic wave shield comprises a metal plate.

3. The magnetic head according to claim 1, wherein:
    said magnetic shield has either one of an engaging projection or an engaging recess for avoiding jumping away from a rotary drum at a time of being attached thereto.

4. A rotary head drum device having a plurality of recording magnetic heads and a plurality of reproducing magnetic heads alternately provided in a circumferential direction of a rotary drum thereof, wherein:
    all or a part of surfaces other than a front surface of a head chip of at least one of said recording magnetic heads and said reproducing magnetic heads are surrounded by a magnetic shield comprising a magnetic flux absorber and an electromagnetic wave shield;
    said magnetic flux absorber has a pipe which surrounds an outer periphery of a coil of said head chip; and
    said electromagnetic wave shield is disposed on an inner peripheral surface of said pipe of said magnetic flux absorber.

5. The rotary head drum device according to claim 4, wherein:
    said magnetic shield has either one of an engaging projection and an engaging recess for avoiding jumping away from the rotary drum at the time of rotation; and
    said rotary drum has either one of an engaging recess and an engaging projection for fitting with said engaging projection or said engaging recess, respectively.

6. A magnetic head comprising a head chip and a magnetic shield disposed so as to surround all or a part of surfaces of said head chip other than a front surface thereof, wherein:
    said magnetic shield comprises a magnetic flux absorber and an electromagnetic wave shield; and
    said magnetic shield has either one of an engaging projection or an engaging recess for avoiding jumping away from a rotary drum at a time of being attached thereto.

7. The magnetic head according to claim 6, wherein:
    said magnetic flux absorber comprises ferrite, and
    said electromagnetic wave shield comprises a metal plate.

8. A rotary head drum device having a plurality of recording magnetic heads and a plurality of reproducing magnetic heads alternately provided in a circumferential direction of a rotary drum thereof, wherein:
    all or a part of surfaces other than a front surface of a head chip of at least one of said recording magnetic heads and said reproducing magnetic heads are surrounded by a magnetic shield comprising a magnetic flux absorber and an electromagnetic wave shield;

said magnetic shield has either one of an engaging projection and an engaging recess for avoiding jumping away from the rotary drum at the time of rotation; and said rotary drum has either one of an engaging recess and an engaging projection for fitting with said engaging projection or said engaging recess, respectively.

* * * * *

UNITED STATES PATENT AND TRADEMARK OFFICE
CERTIFICATE OF CORRECTION

PATENT NO. : 6,954,334 B2  
DATED : October 11, 2005  
INVENTOR(S) : Toshiaki Watkita It is certified that error appears in the above-identified patent and that said Letters Patent is hereby corrected as shown below:

<u>Title page,</u>  
Item [57], ABSTRACT,  
Line 26, delete "80".

Signed and Sealed this

Twenty-first Day of March, 2006

JON W. DUDAS  
*Director of the United States Patent and Trademark Office*